(12) United States Patent
He et al.

(10) Patent No.: US 8,161,738 B2
(45) Date of Patent: Apr. 24, 2012

(54) SYSTEMS AND METHODS FOR ESTIMATING PARTICULATE LOAD IN A PARTICULATE FILTER

(75) Inventors: Suhao He, Painted Post, NY (US); Achim Karl-Erich Heibel, Corning, NY (US); Pushkar Tandon, Painted Post, NY (US)

(73) Assignee: Corning Incorporated, Corning, NY (US)

(*) Notice: Subject to any disclaimer, the term of this patent is extended or adjusted under 35 U.S.C. 154(b) by 562 days.

(21) Appl. No.: 12/324,001

(22) Filed: Nov. 26, 2008

(65) Prior Publication Data

US 2010/0126144 A1 May 27, 2010

(51) Int. Cl.
*F01N 3/00* (2006.01)
(52) U.S. Cl. ............... 60/296; 60/286; 60/287; 60/295
(58) Field of Classification Search ............. 60/295
See application file for complete search history.

(56) References Cited

U.S. PATENT DOCUMENTS

| | | | |
|---|---|---|---|
| 5,110,747 A | 5/1992 | Pataschnick et al. | |
| 6,397,587 B1 | 6/2002 | van Nieuwstadt et al. | |
| 6,408,686 B1 | 6/2002 | Tallio et al. | |
| 6,829,890 B2 * | 12/2004 | Gui et al. | 60/295 |
| 6,941,750 B2 | 9/2005 | Boretto et al. | |
| 6,947,831 B2 | 9/2005 | van Nieuwstadt | |
| 7,017,338 B2 | 3/2006 | van Nieuwstadt | |
| 7,031,827 B2 | 4/2006 | Trudell et al. | |
| 7,065,960 B2 | 6/2006 | Gioannini et al. | |
| 7,243,489 B2 | 7/2007 | Johnson et al. | |
| 7,263,825 B1 | 9/2007 | Wills et al. | |
| 7,322,184 B2 | 1/2008 | Kondou et al. | |
| 2003/0167757 A1 * | 9/2003 | Boretto et al. | 60/295 |
| 2007/0068147 A1 | 3/2007 | Sun et al. | 60/297 |
| 2008/0078236 A1 | 4/2008 | Mital et al. | |

FOREIGN PATENT DOCUMENTS

| | | |
|---|---|---|
| EP | 1 475 523 | 11/2004 |
| EP | 1475523 A1 * | 11/2004 |
| EP | 1 921 289 | 5/2008 |
| WO | WO 2007/035577 A2 | 3/2007 |

OTHER PUBLICATIONS

Haralampous, O.A., et al., "Diesel particulate filter pressure drop Part 1: modelling and experimental validation," International Journal of Engine Research, vol. 5, No. 2, Jan. 1, 2004, pp. 149-162.
Haralampous, O.A., et al., "Diesel particulate filter pressure drop Part 2: on-board calculation of soot loading," International Journal of Engine Research, vol. 5, No. 2, Jan. 1, 2004, pp. 163-173.
Perry, J.H., "Chemical Engineers Handbook," 1950, table Characteristics of dispersed particles.
Tandon, P. and D.E. Rosner, "Translational Brownian Diffusion Coefficient of Large (Multi-Particle) Suspended Aggregates," *I/EC Res.*, 34 (10), 3265-3277, 1995.

* cited by examiner

*Primary Examiner* — Thomas Denion
*Assistant Examiner* — Jason Shanske
(74) *Attorney, Agent, or Firm* — Matthew B. McNutt

(57) ABSTRACT

A method for regenerating a particulate filter may comprise determining a temperature, a flow rate, and a total pressure drop of an exhaust gas flowing through a particulate filter, and determining a corrected soot layer permeability. The method may further comprise calculating an estimated soot load of the particulate filter based on the total pressure drop and the corrected soot layer permeability, and causing regeneration of the particulate filter when the estimated soot load is greater than or equal to a threshold value.

7 Claims, 9 Drawing Sheets

SYSTEMS AND METHODS FOR ESTIMATING PARTICULATE LOAD IN A PARTICULATE FILTER

TECHNICAL FIELD

The present teachings relate generally to systems and methods for estimating particulate load in a particulate filter. More specifically, the present teachings relate to pressure drop based systems and methods that estimate soot load in a particulate filter used with an internal combustion engine.

BACKGROUND

Environmental concerns have motivated the implementation of emission requirements for internal combustion engines and other combustion systems throughout much of the world. Catalytic converters have been used to eliminate many of the pollutants present in exhaust gas; however, a filter is often required to remove particulate matter, such as, for example, ash and soot. Wall-flow particulate filters, for example, are often used in engine systems to remove particulates from the exhaust gas. Such particulate filters may be made of a honeycomb-like substrate with parallel flow channels or cells separated by internal porous walls. Inlet and outlet ends of the flow channels may be selectively plugged, such as, for example, in a checkerboard pattern, so that exhaust gas, once inside the substrate, is forced to pass through the internal porous walls, whereby the porous walls retain a portion of the particulates in the exhaust gas.

In this manner, wall-flow particulate filters have been found to be effective in removing particulates from exhaust gas. However, the pressure drop across the wall-flow particulate filter increases as the amount of particulates trapped in the porous walls increases. The increasing pressure drop results in a gradual rise in back pressure against the engine, and a corresponding decrease in the performance of the engine. Accordingly, soot is commonly oxidized and removed in a controlled regeneration process before excessive levels have accumulated.

The ability to measure or estimate the amount of particulate, such as, for example, soot accumulated in a particulate filter is valuable as it helps to determine the regeneration schedule for the filter. Optimizing a filter's regeneration frequency, for example, can reduce the negative impacts of regeneration (e.g. increased emissions and fuel consumption) from too frequent regeneration, and protect the filter from over-exposure and possible failure due to the heightened energy release caused by excessive particulate loading from too infrequent regeneration. Accurately estimating the particulate load level (e.g., soot load level) in a particulate filter may thus facilitate determining when to initiate a timely and controlled regeneration event.

Conventional methodologies for estimating soot load in a particulate filter include both pressure drop based techniques and mass balance based techniques. A benefit of a pressure drop method is the closed loop feedback that it provides; however, the accuracy in the soot load predictability of conventional pressure drop approaches is still quite limited. Common pressure drop based techniques include, for example, using a differential pressure sensor to measure the pressure change of exhaust gas upstream and downstream from a particulate filter, and approximating a soot load based on the pressure change. Such approaches, however, may not account for a particulate filter's total pressure drop behavior (e.g. including pressure drop contributions from a filter's inlet/outlet losses, channel losses and permeable layer losses) and as a result some approaches rely on an empirical correlation in order to estimate soot load from the differential pressure sensor response. The reliance on empirical correlations may be relatively inaccurate over wide temperature and flow ranges, particularly performing poorly under dynamic conditions. Furthermore, such approaches do not account for the impact of ash loading in the filter or the impact of non-continuum gas effects on the pressure drop behavior of the filter.

An approach to estimating soot load that does not account for a filter's total pressure drop behavior, including contributions from inlet contraction and outlet expansion losses as fluid flows through the channels of a particulate filter, has limited accuracy. For example, such an approach would be accurate only under certain conditions, for example, at large soot load levels when channel and permeable layer losses substantially dominate inlet/outlet losses.

In one relatively recent pressure drop based approach, non-continuum gas effects on the pressure drop behavior of a particulate filter are considered based on empirical data fitting, where the cake soot layer permeability has been decoupled into temperature and mass flow rate contributions. Such an empirical approach, however, can provide only derived constants that would need reevaluation for any change in filter geometry and/or microstructure, thereby making such an approach applicable over only a relatively narrow range of conditions and filter configurations.

A need still exists, therefore, for a pressure drop based approach with a high level of accuracy over a wide range of operating conditions and for a wide range of filter geometries and microstructure characteristics.

SUMMARY

In accordance with various exemplary embodiments, the present teachings provide a method for regenerating a particulate filter, comprising determining a temperature, a flow rate, and a total pressure drop of an exhaust gas flowing through a particulate filter; determining a corrected soot layer permeability; calculating an estimated soot load of the particulate filter based on the total pressure drop and the corrected soot layer permeability; and causing regeneration of the particulate filter when the estimated soot load is greater than or equal to a threshold value.

In accordance with various additional exemplary embodiments, the present teachings provide a method for regenerating a particulate filter, comprising estimating a soot load in a particulate filter based on at least the particulate filter's geometric properties, the particulate filter's microstructural properties, a total pressure drop of exhaust gas flowing through the particulate filter, a flow rate of the exhaust gas flowing through the particulate filter, a temperature of the exhaust gas flowing through the particulate filter, and a Stokes-Cunningham correction factor to soot layer permeability; comparing the estimated soot load to a threshold soot load; and causing regeneration of the particulate filter when the estimated soot load is greater than or equal to the threshold soot load.

In accordance with various further exemplary embodiments, the present teachings provide a system for estimating soot load in a particulate filter, comprising at least one temperature sensor; at least one pressure drop sensor; and at least one controller configured to receive signals from the at least one temperature sensor and the at least one pressure drop sensor, the at least one controller being further configured to dynamically estimate a soot load in a particulate filter based on the signals, an exhaust gas flow rate, the particulate filter's inlet contraction losses and outlet expansion losses, the particulate filter's geometric and micro-structural properties, and a Stokes-Cunningham correction factor to soot layer permeability.

In accordance with various additional exemplary embodiments, the present teachings further provide a method for regenerating a particulate filter, comprising determining a temperature, a flow rate, and a pressure drop of an exhaust gas flowing through a particulate filter; determining a corrected soot layer permeability without using empirically derived values; calculating an estimated soot load of the particulate filter based on the pressure drop and the corrected soot layer permeability; and causing regeneration of the particulate filter when the estimated soot load is greater than or equal to a threshold value.

Additional objects and advantages will be set forth in part in the description which follows, and in part will be obvious from the description, or may be learned by practice of the present teachings. The objects and advantages may be realized and attained by means of the elements and combinations particularly pointed out in the appended claims.

It is to be understood that both the foregoing general description and the following detailed description are exemplary and explanatory only and are not restrictive of the claims.

BRIEF DESCRIPTION OF THE DRAWINGS

The present teachings can be understood from the following detailed description either alone or together with the accompanying drawings. The drawings are included to provide a further understanding of the present teachings, and are incorporated in and constitute a part of this specification. The drawings illustrate one or more embodiments of the present teachings and together with the description serve to explain the principles and operation.

DETAILED DESCRIPTION

Figure 1:
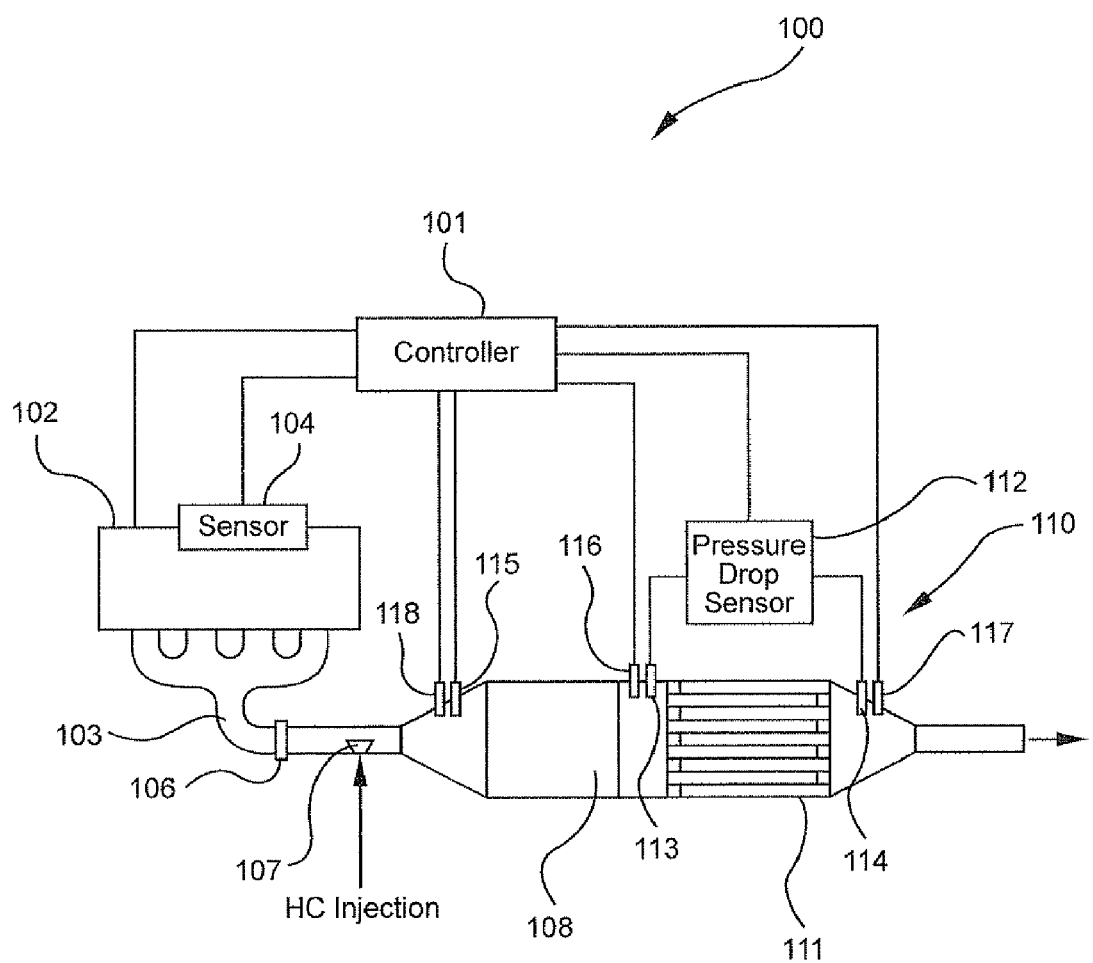
FIG. 1 is a schematic diagram depicting the structure of an exemplary embodiment of a system for estimating soot load in accordance with the present teachings.

The pressure drop behavior of a fluid (e.g., post-combustion gas) flowing through a particulate filter may be used to estimate the particulate load in the particulate filter. For example, as a particulate accumulates in the filter, the pressure drop across the filter (e.g., from an inlet end to an outlet end) increases due to the increased restriction of the fluid (e.g., gas) passing through the filter's permeable particulate (e.g., including soot particulate and ash particulate) and porous wall layers. The total resulting pressure drop, however, is actually a combination of various pressure changes incurred by the fluid as it flows through the particulate filter. For a particulate filter used to filter exhaust gases from combustion systems, such as, for example, internal combustion engines (including, e.g., diesel and gasoline engines), for example, this total pressure drop includes: a pressure change as the exhaust gas enters the filter (inlet contraction), a pressure change as the gas flows in the inlet channel, a pressure change as the gas passes through a permeable soot layer, a pressure change as the gas passes through a permeable ash layer, a pressure change as the gas passes through the filter wall, a pressure change as gas flows in the outlet channel, and a pressure change as the exhaust gas finally exits the filter (outlet expansion). Consequently, a particulate filter's total pressure drop results not only from the particulate load in the filter, but also from inlet/outlet contraction losses, inlet/outlet channel losses and permeable layer losses (for example, including particulate, such as, for example, soot and ash, and wall permeability). In order to accurately estimate the particulate load in a particulate filter under dynamic loading conditions, exemplary embodiments of the present teachings can consider all of these pressure changes, while also taking into account the implications of a particulate filter's microstructure, geometry and particulate loading levels on the filter's pressure drop behavior.

The dynamic operating conditions of a combustion system (such as, for example, an engine's idling, acceleration and deceleration) can additionally create a wide and varying range of temperatures and flow rates as post-combustion gas (e.g., exhaust gas) passes through the filter. Consequently, when determining a total pressure drop, exemplary embodiments of the present teachings can additionally consider such non-continuum gas effects, and continuously account for changing post-combustion gas temperatures and exhaust gas flow rates.

Various exemplary embodiments mentioned above and described herein include systems and methods that estimate a particulate load in a filter under dynamic operating conditions, systematically taking into account the filter's total pressure drop behavior, including implications of the filter's microstructure, geometric properties and particulate (e.g., soot/ash) loading levels. Exemplary embodiments described herein include systems and methods that consider a particulate filter's total pressure drop behavior to accurately estimate a soot load in the filter under a complete range of operating conditions of a combustion system (e.g., an engine), and timely cause regeneration of the filter when the estimated soot load is greater than or equal to a threshold value. Exemplary embodiments described herein include systems and methods that provide a pressure drop based approach for estimating particulate load that is relatively simple to implement, using the instrumentation and sensors already available as part of an engine's after-treatment system.

As used herein, the term "particulate filter" or "filter" refers to a structure which is capable of removing particulate matter, such as, for example, soot and ash, from a fluid stream, such as, for example, an exhaust gas stream, passing through the structure. The present teachings may apply to the removal of soot and ash and/or other particulate matter from any exhaust gas stream, such as, for example, exhaust gases produced by internal combustion engines, such as gasoline and diesel engines, and coal combustion flue gases produced in coal gasification processes. As used herein, the term "soot" refers to impure carbon particles that result from the incomplete combustion of hydrocarbons, such as, for example, during the internal combustion process. The term "ash" refers to non-combustible metallic material that is found in almost all petroleum products. For diesel applications, ash is typically produced from crankcase oil and/or fuel borne catalysts.

As used herein, the term "total pressure drop" refers to the pressure drop resulting from a combination of inlet/outlet contraction losses, inlet/outlet channel losses and permeable layer losses, including particulate (e.g., soot and ash) and wall permeability losses, represented by the relation:

$$\Delta p = \Delta p_{in/out} + \Delta p_{inlet\text{-}channel} + \Delta p_{outlet\text{-}channel} + \Delta p_{soot} + \Delta p_{ash} + \Delta p_{wall},$$

wherein $\Delta p$ is the total pressure drop, $\Delta p_{in/out}$ represents the inlet/outlet contraction losses, $\Delta p_{inlet\text{-}channel}$ represents the inlet channel losses, $\Delta p_{outlet\text{-}channel}$ represents the outlet channel losses, $\Delta p_{soot}$ represents the soot permeable layer losses, $\Delta p_{ash}$ represents the ash permeable layer losses and $\Delta p_{wall}$ represents the wall permeable layer losses.

As used herein, the term "causing regeneration" refers to the initiation of filter regeneration, regardless of the type of regeneration. By way of example only, the present teachings contemplate using any known suitable regeneration methods and/or techniques, including, but not limited to, active and passive regeneration, and on-board and off-board (requiring operator intervention) regeneration. Exemplary regeneration techniques include, for example, heating inlet exhaust gases to a temperature at which it is favorable to burn soot off of a particulate filter and/or adding a catalyst to the filter to decrease the soot reaction light-off temperatures. Those ordinarily skilled in the art are familiar with various regeneration techniques for particulate filters and the present teachings contemplate any such regeneration techniques.

The filters of the present teachings can have any shape or geometry suitable for a particular application, as well as a variety of configurations and designs, including, but not limited to, a flow-through monolith structure, a wall-flow monolith structure, or any combination of thereof (e.g., a partial-flow monolith structure). Exemplary flow-through monoliths include, for example, any monolithic structure comprising channels or porous networks or other passages that are open at both ends and permit the flow of exhaust gas through the monolith passages from one end to an opposite end. Exemplary wall-flow monoliths include, for example, any monolithic structure comprising channels or porous networks or other passages with individual passages open and plugged at opposite ends of the structure, thereby enhancing gas flow through the channel walls of the monolith as the exhaust gas flows from one end to the other. Exemplary partial-flow monoliths include, for example, any monolithic structure that is partially flow-through and partially wall-flow. Various exemplary embodiments of the present teachings contemplate utilizing the cellular geometry of a honeycomb configuration due to its high surface area per unit volume for deposition of soot and ash. Those having ordinary skill in the art will understand that the cross-section of the cells of a honeycomb structure may have virtually any shape and may include, by way of example and without limitation, square, rectangular, hexagonal, triangular, circular, and oval cross-sections. Similarly, a honeycomb structure may be configured as either a flow-through structure, a wall-flow structure, or a partial-flow structure.

FIG. 1 is a schematic, block diagram of one exemplary embodiment of a system for estimating soot load in accordance with the present teachings. A soot load estimation system 100 is shown in operational relationship with an internal combustion engine 102. The engine 102 can be any type of internal combustion engine, including, but not limited to, for example, an auto-cycle engine, a two-stroke engine or a diesel engine, used in any type of machine or vehicle, stationary or moving, including a pump, generator, automobile, truck, boat, train, etc.

The engine 102 has an exhaust manifold 103 to direct exhaust gases from the engine 102 to an exhaust system 110. Exhaust system 110 is coupled to the exhaust manifold 103 via an exhaust flange 106 and may include a particulate filter 111, a pressure drop sensor 112, and temperature sensors 116 and 117. In an exemplary embodiment of a diesel engine system, depicted for example in FIG. 1, a doser 107 for hydrocarbon injection supplied by post- or in-cylinder injection, a temperature sensor 115 and a diesel oxidation catalyst (DOC) 108 may also be provided upstream of the particulate filter 111. Also, in an exemplary embodiment, as depicted for example in FIG. 1, a flow rate sensor 118 may also be included. As will be described in further detail below, however, flow rate may also be estimated rather than or in addition to being sensed.

Although the particulate filter 111 is depicted as a cylindrical wall-flow monolith, those skilled in the art would understand that such shape and configuration is exemplary only and particulate filters in accordance with the present teachings may have any shape or geometry suitable for a particular application, as well as a variety of configurations and designs, including, but not limited to, a wall-flow monolith structure, a flow-through monolith structure and a partial-flow monolith structure.

Those having skill in the art will further understand that the number and positioning of sensors 112, 115, 116, 117 and 118, and the various post-combustion gas treatment components, such as for example the doser 107 and DOC 108, depicted in FIG. 1, are schematic and exemplary only and that the exhaust system 110 may include a variety of sensor configurations and components without departing from the scope of the present teachings. Those having ordinary skill in the art would understand how to modify the sensors and/or components depicted in FIG. 1 based on desired treatment and control mechanisms without departing from the scope of the present teachings. Various exemplary embodiments of the present teachings, for example, contemplate the pressure drop sensor 112 as a set of sensors 113 and 114 positioned upstream and downstream of the particulate filter 111, respectively. Various additional exemplary embodiments of the present teachings consider a single pressure drop sensor 112 configured to measure the differential pressure across the particulate filter 111. Various exemplary embodiments of the present teachings further contemplate, for example, a set of sensors 116 and 117 positioned upstream and downstream of the particulate filter 111, respectively, to determine, for example, an average temperature of the exhaust gas flowing through the particulate filter 111. Various additional exemplary embodiments of the present teachings also contemplate a single temperature sensor 116 configured to measure the input temperature of the particulate filter 111, for example, when only one sensor is available, whereas various further exemplary embodiments of the present teachings contemplate a single temperature sensor 117 configured to measure the output temperature of the particulate filter 111, for example, during regeneration conditions. Furthermore, various exemplary embodiments of the present teachings additionally consider the temperature sensor 116 configured to measure the DOC out/particulate filter in exhaust gas temperature using an energy balance on the DOC 108. Based on the present teachings, those having skill in the art would understand various other sensor types, positions, and configurations that may be used to implement the particulate load estimation systems and methods in accordance with exemplary embodiments.

Various exemplary embodiments of the present teachings contemplate using existing sensors already available as part of the exhaust system 110. Various exemplary embodiments of the present teachings also contemplate systems which include additional sensors as needed to provide the signal inputs used in the systems and methods of the present teachings. Those skilled in the art would understand that the type, number and configuration of such sensors may be chosen as desired based on availability, expense, efficiency and other such factors.

Those ordinarily skilled in the art also would understand that the exhaust system 110, as a whole, is exemplary only and not intended to be limiting of the present teachings and claims. For example, in FIG. 1, the DOC 108 may be positioned upstream of the particulate filter 111 to better facilitate heating of the exhaust gas through reactions with hydrocarbons (HC) provided by post or in-cylinder injection by doser 107. Depending upon the type of engine used and the particular application employed, the exhaust system 110 may include additional after-treatment components, such as, for example, additional catalysts, traps, mufflers, heaters, reductant injectors, and/or bypass valves in combination with the particulate filter 111.

A controller 101 is configured to receive signals from the various sensors, which may include, for example, the pressure drop sensor 112, temperature sensors 115, 116 and 117, and the flow rate sensor 118. Controller 101 is configured to dynamically estimate a soot load in the particulate filter 11 based on the signals received from one or more of the sensors 112, 115, 116, 117 and 118 as set forth in the following exemplary embodiments and as would be understood by those having ordinary skill in the art depending on which sensors are available in a system for which soot load estimation is desired. The controller 101 may include an existing controller such as an engine control unit (ECU), a dedicated controller, or control may be distributed among more than one controller, as would be understood by one skilled in the art.

In various exemplary embodiments of the present teachings the engine 102 can include additional sensors and/or instrumentation, indicated generally at 104, which provide information about engine performance (e.g. amount of oil consumed, mass airflow etc.) to the controller 101. Controller 101 can be configured to dynamically estimate an ash load in the particulate filter 111 based on the signals received from sensors 104.

In various exemplary embodiments of the present teachings, rather than measuring flow rate directly, for example, using sensor 118 in the exemplary embodiment of FIG. 1, the controller 101 is configured to directly estimate the flow rate of the exhaust from other measured values, such as, for example, engine speed and load or fuel flow and air flow provided by the signals received from sensors 104. The exhaust flow rate can be estimated, for example, by adding the flow rate of the air admitted into the engine and the total quantity of fuel injected into the engine.

In accordance with various exemplary embodiments of the present teachings, for a particulate filter 111 of diameter D and length L, through which exhaust gas is flowing at a flow rate Q, a face velocity, $U_f$, can be defined as:

$$U_f = \frac{4Q}{\pi D^2} \quad [1]$$

The filter's total pressure drop behavior can then be correlated to the face velocity using the following relation:

$$Eu = \frac{A_1}{Re} + \frac{A_2}{ReSCF_{soot}} + A_3 \quad [2]$$

wherein the Euler number, Eu, and the Reynolds number, Re, can be determined using the relations:

$$Eu = \frac{\Delta P}{(\rho U_f^2/2)} \quad [3]$$

$$Re = \frac{\rho_{ref} U_f D}{\mu} \quad [4]$$

and wherein $\Delta P$ is the pressure drop, $\rho$ is the gas density, $\mu$ is the gas viscosity, and $SCF_{soot}$ is the Stokes-Cunningham factor correction to the soot layer permeability.

The present teachings contemplate using any known suitable methods to determine gas density and gas viscosity, such as, for example, by relying on the exhaust gas temperature T, which may be determined, for example, from measurements from sensors 116 and 117, such as by averaging or otherwise weighting those measurements using the relations:

$$\rho = \frac{PM}{RT} \quad [5]$$

$$\mu = 0.0000172\left(\frac{T}{293.15}\right)^{0.74} \text{ (in kg/m.sec)} \quad [6]$$

wherein P is pressure, T is temperature, M is the molecular weight, and R is the gas constant. Those having ordinary skill in the art will understand, however, that the temperature may also be measured using other sensors alone or in combination, such as for example, sensors 116, 116, and/or 117.

Furthermore, to account for non-continuum gas effects on soot layer permeability, exemplary embodiments of the present teachings contemplate using a known correction factor, such as, for example, a Stokes-Cunningham factor, which, for soot, is a function of soot layer pore Knudsen number, $K_{np}$, and can be defined as:

$$SCF = 1 + Knp(1.257 + 0.4\exp(-1.1/Knp)) \quad [7]$$

wherein the soot layer pore Knudsen number, $K_{np}$, can be defined as:

$$Knp = \frac{L_{mfp}}{d_{soot}}\left[\left(1 - \left(\frac{(1-S\_vf)}{0.6}\right)^{1.71}\right) + 1.5*\left(\frac{(1-S\_vf)}{S\_vf}\right)\left(\frac{(1-S\_vf)}{0.6}\right)^{1.71}\right] \quad [8]$$

and wherein $L_{mfp}$ is the gas mean-free-path, $d_{soot}$ is soot particle diameter, and S_vf is the solid fraction of the soot layer.

Although various exemplary embodiments of the present teachings assume availability of $L_{mfp}$, $d_{soot}$ and S_vf, the above information can be obtained through any known suitable method, including methods that may require information from additional system sensors and/or instrumentation. For example, $L_{mfp}$ can be defined using the relation:

$$L_{mfp} = \frac{\mu}{\rho}\sqrt{\frac{\pi M}{2RT}} \quad [9]$$

while $d_{soot}$ and S_vf can be directly measured. By way of non-limiting example, $d_{soot}$ can be determined from scanning electron microscopy (SEM) analysis of diesel soot, and soot density can be estimated by dissecting a test particulate filter and accounting for soot mass and volume (e.g., measuring density as a function of flow conditions and correlating quantities). Those having ordinary skill in the art would understand various techniques for determining $d_{soot}$ and S_vf.

In various exemplary embodiments of the present teachings, filter parameters $A_1$, $A_2$ and $A_3$ can be directly calculated using the following equations:

$$A_1 = \frac{WD}{CPSIK_0 L_{eff} D_{hloaded}} + \frac{4FD}{3CPSI}\left(\frac{L_{plug}}{D_{hloaded}^4} + \frac{L_{plug} + L_{ash}}{D_h^4}\right) + \frac{D}{2CPSIL_{eff} K_{ash}}\ln\left(\frac{D_h}{D_h - 2W_{ash}}\right) \quad [10]$$

$$A_2 = \frac{D}{2CPSIL_{eff} K_{soot}}\ln\left(\frac{D_h - 2W_{ash}}{D_h - 2W_{soot} - 2W_{ash}}\right) \quad [11]$$

$$A_3 = \frac{8}{3CPSI^2}\left[\frac{\zeta_{in}\rho}{D_{hloaded}^4 \rho_{in}} + \frac{2\zeta_{out}\rho}{D_h^4 \rho_{out}}\right] \quad [12]$$

wherein CPSI is the cells per unit area of the filter; W is the filter wall thickness; $K_0$ is the filter wall permeability; $K_{soot}$ is the soot layer permeability; $K_{ash}$ is the ash layer permeability; $L_{eff}$ is the effective length for filtering, which can be derived from filter geometry parameters (e.g., $L_{eff}=L_{filter}-2L_{plug}-L_{ash}$, wherein $L_{filter}$ is the length of the filter, $L_{plug}$ is the length of the plug and $L_{ash}$ is the length of the ash plug); $D_h$ is clean filter hydraulic diameter; $D_{hloaded}$ is the soot/ash loaded hydraulic diameter; F is the friction factor with a value of 28.454; $W_{ash}$ and $W_{soot}$ are the thickness of the ash and soot layers in the channel; and $\zeta_{in}$ and $\zeta_{out}$ are the coefficients of filter contraction and expansion losses. The ash and soot layer thicknesses, $W_{ash}$ and $W_{soot}$ are estimated based on the soot and ash loading levels, their deposit densities and the partition functions between the amount of ash/soot on the wall and the amount of ash/soot in the channel plug. The amount of ash in the filter is estimated based on the ash content and the consumption of crankcase oil used during engine operation. While the ash level can be estimated in this open-loop fashion, the ash layer thickness in the channel significantly influences the filter's pressure drop behavior through its influence on channel hydraulic diameter (e.g., decrease in channel hydraulic diameter), as illustrated by Eq. [11].

Although various exemplary embodiments of the present teachings assume availability of the above filter configuration (e.g., geometry and microstructure) and particulate information required in the equations 10-12 above, that information can be obtained through any known suitable method, including methods that may require information from additional system sensors and/or instrumentation. Regardless of how the filter configuration and particulate information is obtained, however, exemplary embodiments of the present teachings utilize that information to solve for the parameters A1, A2, and A3 directly during the operation of the engine and particulate buildup without using an empirical approach. In this manner, the approach to estimating particulate (e.g., soot) load can be applied universally to differing filter geometries and microstructural properties operating under a wide range of conditions.

Various exemplary embodiments of the present teachings contemplate, for example, as discussed in more detail in Tandon, P. and D. E. Rosner, "Translational Brownian Diffusion Coefficient of Large (Multi-Particle) Suspended Aggregates," I/EC Res., 34 (10), 3265-3277, 1995, directly calculating permeability, K, for a porous layer (which can be wall ($K_0$), soot ($K_{soot}$), or ash ($K_{ash}$)) using the relations:

$$K \approx \frac{3 - \frac{9}{2}(\varphi)^{\frac{1}{3}} + \frac{9}{2}(\varphi)^{\frac{5}{3}} - 3(\varphi)^2}{18\varphi\left(3 + 2\varphi^{\frac{5}{3}}\right)} D_c^2 \quad [13]$$

$$\varphi = (1-\varepsilon) \quad [14]$$

wherein collector diameter, $D_c$, and porosity, $\varepsilon$, can be determined from measurement, for example, using mercury porosimetry.

In accordance with various exemplary embodiments of the present teachings, the inventors have discovered that, for a given ash load, filter parameters $A_1$, $A_2$ and $A_3$ can be accurately fitted to a polynomial function (e.g., a first order or greater order polynomial) of soot load (SL), such as, for example, a second order polynomial function of SL as follows:

$$A_1 = a_1 SL^2 + b_1 SL + c_1$$

$$A_2 = a_2 SL^2 + b_2 SL + c_2$$

$$A_3 f(SL, \text{Engine Conditions}) \quad [15]$$

Thus, with an instantaneous measurement of pressure drop and temperature, for example, by one or more of sensors 112, 115, 116, and 117, and flow rate, such as, for example, either by estimation as explained above or by measurement using sensor 118, a controller 101 can estimate a parameter A as:

$$A = (Eu - A_3) ReSCF_{soot} \quad [16]$$

The instantaneous soot load, $SL_A$, in the particulate filter 111 may then be estimated using the following equation:

$$SL_A = \frac{-(SCF_{soot}b_1 + b_2) + \sqrt{SCF_{soot}^2 b_1^2 + b_2^2 + 2SCF_{soot}b_1 b_2 - 4(SCF_{soot}a_1 + a_2)(SCF_{soot}c_1 + c_2 - A)}}{2(SCF_{soot}a_1 + a_2)} \quad [17]$$

Alternative exemplary embodiments of the present teachings contemplate systems and methods that estimate soot load by assuming that soot permeable layer losses substantially dominate other pressure losses (e.g., channel losses, inlet/ outlet losses, and wall and ash permeable layer losses). In this case, the filter's total pressure drop behavior can be correlated to the face velocity using the following simplified relation:

$$Eu = \frac{B}{ReSCF_{soot}} \quad [18]$$

wherein filter parameter B can be accurately fitted to a polynomial function of soot load (SL) (which again may be a first order or higher order polynomial), such as, for example, a second order polynomial function of SL as:

$$B = a_3 SL^2 + b_3 SL + c_3 \quad [19]$$

The instantaneous soot load, $SL_B$, in the particulate filter 111 may then be estimated using the following equation:

$$SL_B = \frac{-b_3 + \sqrt{b_3^2 - 4a_3(c_3 - B)}}{2a_3} \quad [20]$$

Figure 2:
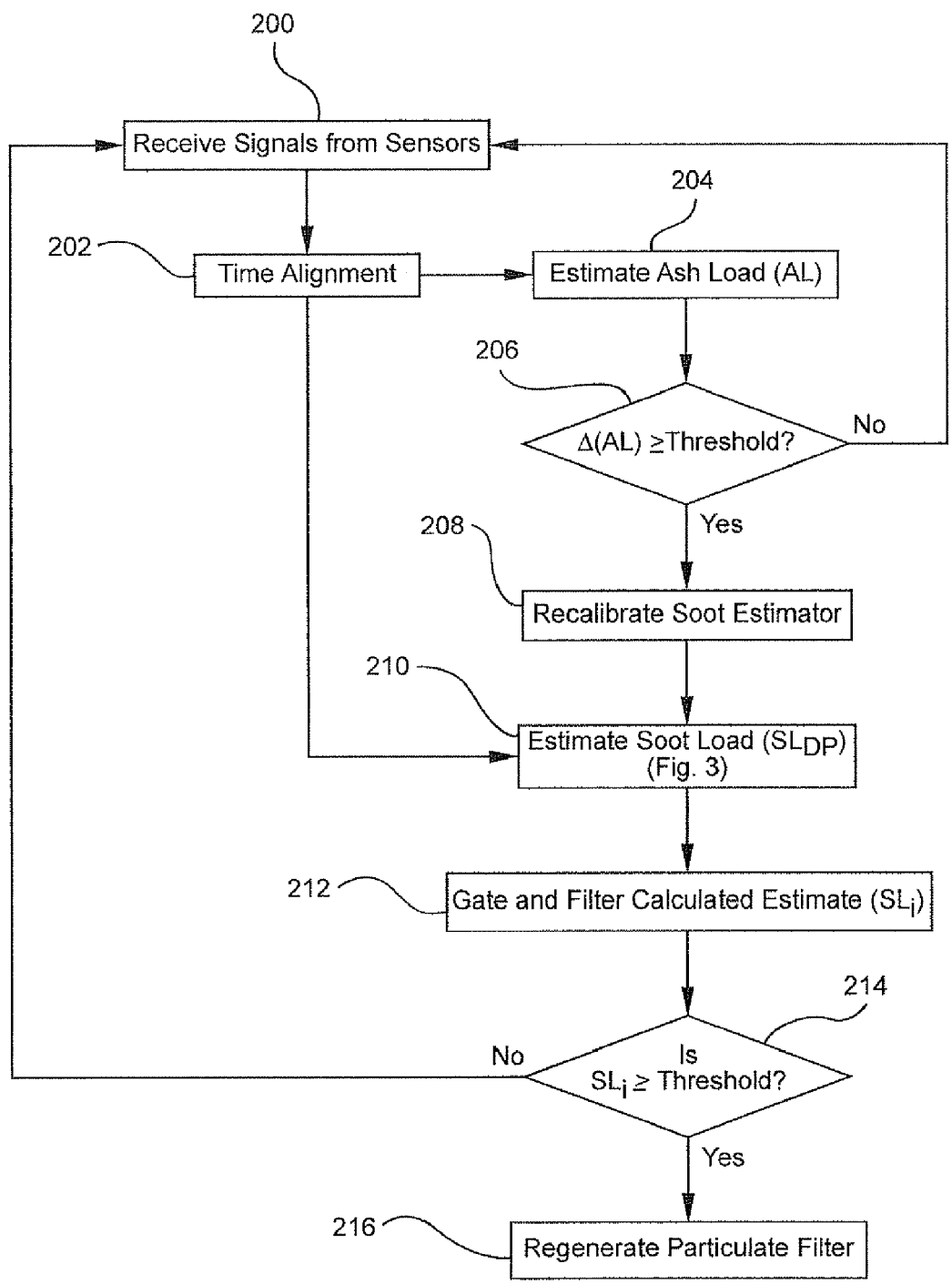
FIG. 2 is a logic flow diagram depicting an exemplary embodiment of a method for causing regeneration of a particulate filter in accordance with the present teachings.

FIG. 2 shows a logic flow diagram depicting an exemplary embodiment for causing regeneration of a particulate filter in accordance with the present teachings. In step 200 of FIG. 2, input signals are received from one or more sensors. The signals can correspond to the temperature, flow rate, and pressure drop of an exhaust gas flowing through the particulate filter, information about the configuration of the particulate filter (e.g., geometry and microstructure), as well as one or more engine operating conditions, such as, for example, the amount of oil consumed and/or engine run time.

Various exemplary embodiments of the present teachings additionally consider directly estimating the flow rate of the exhaust from other measured values, such as, for example, engine speed and load or fuel flow and air flow. The exhaust flow rate can be estimated, for example, by adding the flow rate of the air admitted into the engine and the total quantity of fuel injected into the engine.

Various exemplary embodiments of the present teachings employ time alignment adjustments to the signals used to estimate soot load prior to performing calculations based on those signals. Thus, as shown in step 202 of FIG. 2, time alignment is applied to the data received from the signals or otherwise from estimations as described above. The present teachings contemplate using any known suitable time alignment methods and/or techniques as would be understood by those skilled in the art.

As shown in step 210 of FIG. 2, a soot load, $SL_{DP}$, in the particulate filter is continuously estimated from the measured temperature, flow rate and pressure drop data as described above and shown and described in more detail below with reference to FIG. 3.

After performing the soot load estimate, various exemplary embodiments of the present teachings employ gates and filters to the soot load estimates, as shown in step 212 of FIG. 2. Gating the predicted soot load at this step, for example, may help to ensure that the soot load estimator is operating within a region in which the model produces relatively accurate estimates, and that the sensors are not malfunctioning or reacting to irregular operating conditions, such as, for example, extreme temperature and/or weather conditions, thereby generally providing more accurate soot load estimates. Although, as shown in FIG. 2, gates may be applied to the predicted soot load after soot load estimation, those skilled in the art will understand that step 212 is exemplary only and that the gates may be applied at other steps in the flow diagram shown in FIG. 2. For example, gates may be applied directly to the input data prior to soot load estimation (e.g., after time alignment) or, as shown, to the soot load estimate after soot load estimation. Furthermore, the present teachings contemplate using any known suitable gating methods and/or techniques as would be understood by those skilled in the art.

Similarly, filtering the soot load estimates also may occur, as indicated at step 212 in FIG. 2. Such filtering may help to reduce wide fluctuations in estimates resulting from dynamic engine operating conditions, thereby also generally providing more accurate soot load estimates. The present teachings contemplate using any known suitable filtering methods and/or techniques as would be understood by those skilled in the art. As explained above with reference to the use of gates, those having ordinary skill in the art would understand that filters may be applied at various steps in the logic flow shown in FIG. 2 and the application of filters after the soot load estimate at step 212 shown in that exemplary embodiment is exemplary only.

After the filtered estimated soot load, $SL_i$, is determined, the next step, 214, in the exemplary embodiment of FIG. 2 compares $SL_i$ to a threshold soot load to determine whether or not the estimated soot load level in the particulate filter is sufficient to warrant regeneration of the filter. If the estimated soot load is greater than or equal to the threshold value, the system causes regeneration of the filter, as indicated by the last step, 216, shown in the flow diagram of FIG. 2. The present teachings contemplate, for example, using any known suitable activation methods and/or techniques as would be understood by those skilled in the art. By way of example only, the present teachings contemplate using any known suitable regeneration methods and/or techniques, including, but not limited to, active and passive regeneration, and on-board and off-board (requiring operator intervention) regeneration. Exemplary regeneration techniques include, for example, heating inlet exhaust gases to a temperature at which it is favorable to burn soot off of a particulate filter and/or adding a catalyst to the filter to decrease the soot reaction light-off temperatures.

As also illustrated in the flow diagram shown in FIG. 2, various additional embodiments of the present teachings also may employ ash load estimation to determine when the parameters, $a_i$, $b_i$ and $c_i$ (e.g., Eqs. 17 and 20) need re-calibration. As discussed above, a particulate filter's pressure drop behavior is a function of both soot load and ash load. Accordingly, it may be beneficial to take ash load in to account when estimating soot load. When ash load estimation is implemented, soot load estimation can be performed either in a mode where ash load (AL) is continuously updated (and thus parameters $a_i$, $b_i$, and $c_i$ are continuously updated) or in a mode where ash load is updated only at discrete intervals. As shown in step 204 of FIG. 2, in the mode where ash load is updated only at discrete intervals, when a change in ash load ($\Delta AL$) is greater than or equal to a threshold value at step 206, a trigger can be sent to re-calibrate the soot estimator at step 208, thereby updating $a_i$, $b_i$, and $c_i$. After the calibration, soot estimation can use the updated parameters $a_i$, $b_i$, and $c_i$ until it receives the next trigger to re-calibrate (e.g., the next time the change in ash load exceeds a threshold value).

The ash load (AL) in the particulate filter can be continuously estimated, for example, from the measured engine operating data. The present teachings contemplate using any known suitable methods to estimate ash load. Various exemplary embodiments contemplate, for example, estimating ash load as a function of engine operating time or as a function of engine oil consumption. Although exemplary embodiments of the present teachings assume availability of such information, estimated ash load can be obtained through any known suitable method, including methods that may require information from additional engine sensors and/or instrumentation in order to estimate the ash load.

Figure 3:
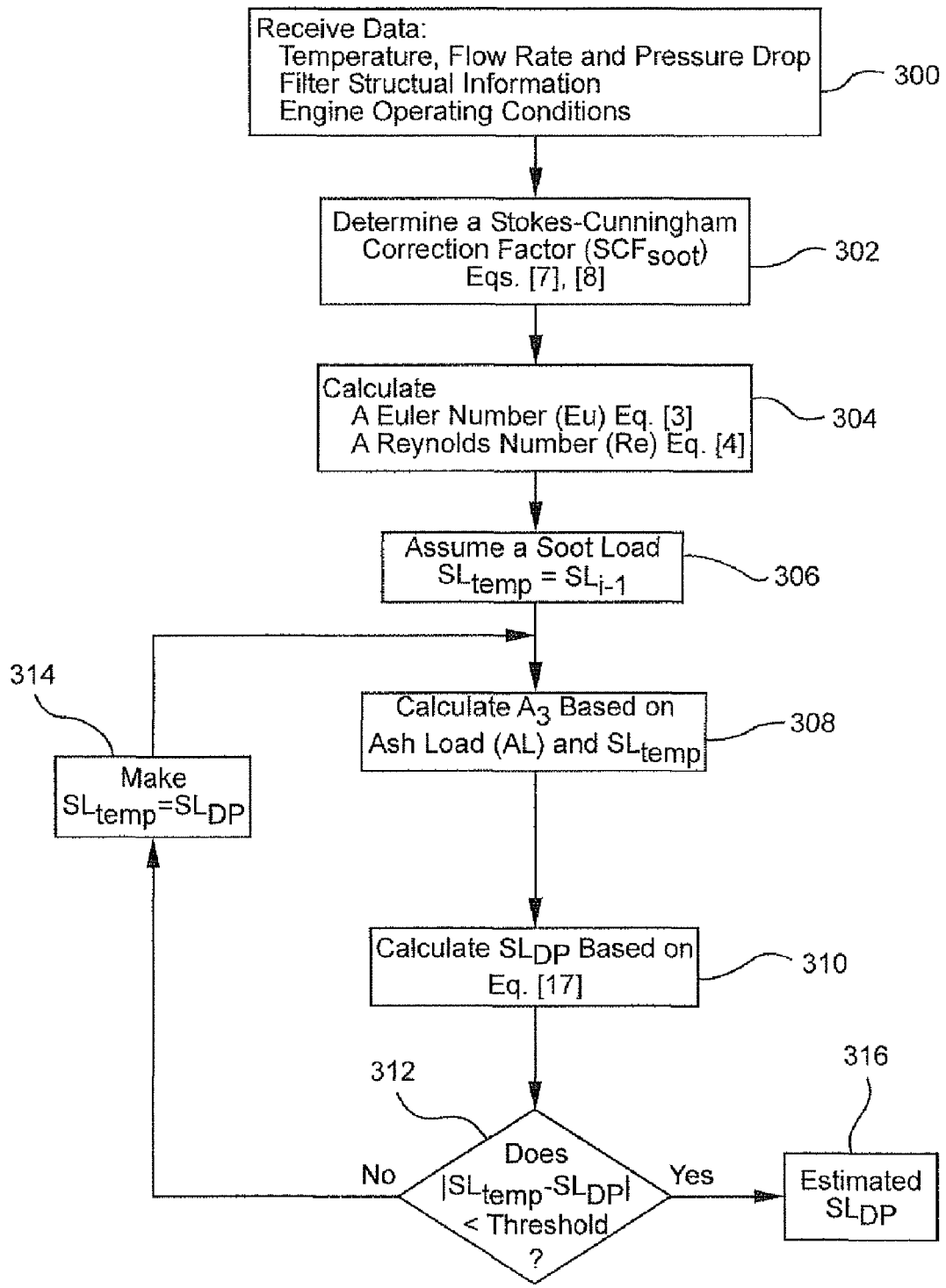
FIG. 3 is a logic flow diagram depicting an exemplary embodiment of a method for estimating soot load in accordance with the present teachings.

Referring now to FIG. 3, a logic flow diagram depicting one exemplary embodiment for implementing the estimation of soot load in accordance with the present teachings is depicted. In step 300 of FIG. 3, input signals are received from one or more sensors. The signals can correspond to the temperature, flow rate, and pressure drop of an exhaust gas flowing through the particulate filter, configuration information (e.g., structural information) of the particulate filter, as well as one or more engine operating conditions, such as, for example, the amount of oil consumed and/or engine run time.

As explained above, to account for non-continuum gas effects on soot layer permeability, in step 302 of FIG. 3, a known correction factor, such as, for example, a Stokes-Cunningham factor, $SCF_{soot}$, can be used, which can be determined, for example, utilizing equations [7] and [8]. As shown in step 304 of FIG. 3, an Euler number, Eu, and a Reynolds number, Re, can then be calculated utilizing equations [3] and [4] respectively.

In step 306 of FIG. 3, a soot load, $SL_{temp}$, is assumed based on the soot load from the last time step ($SL_{i-1}$). In step 308, to estimate a current soot load in the particulate filer, a filter parameter $A_3$ can be determined based on the assumed soot load ($SL_{temp}$) and an estimated ash load (AL). An estimated soot load ($SL_{DP}$) for that time step can then be calculated utilizing equation [17], as indicated by step 310 shown in the flow diagram in FIG. 3. The new soot load at the current time step, $SL_i$, can then be determined using the last time step value, $SL_{i-1}$, and the estimation at that time step, $SL_{DP}$, using the following equation:

$$SL_i = \alpha SL_{i-1} + (1-\alpha) SL_{DP} \quad [21]$$

wherein alpha, $\alpha$, is a data filtering constant.

As shown in the final steps depicted in the flow diagram of FIG. 3, various exemplary embodiments of the present teachings also contemplate an iterative approach, in which at step 312 the absolute value of the difference between the assumed soot load ($SL_{temp}$) and the estimated soot load ($SL_{DP}$) is compared to a threshold value to establish the fidelity of the assumption and the resulting accuracy of the estimate. If $|SL_{temp} - SL_{DP}|$ is less than the threshold value, the estimate is accurate and estimation is complete at step 316. If $|SL_{temp} - SL_{DP}|$ is not less than the threshold value, however, a new assumption is made at step 314, making $SL_{temp}$ equal to $SL_{DP}$, thereby recalculating a new value for parameter $A_3$ at step 308 and a new estimated soot load $SL_{DP}$ at step 310. This assumption can be repeated until $|SL_{temp} - SL_{DP}|$ is less than the threshold value at step 312. As discussed above, once $SL_{DP}$ is determined to be accurate (i.e. $|SL_{temp} - SL_{DP}|$<Threshold), filters and/or gates may be applied as appropriate to determine $SL_i$.

Figure 4A:
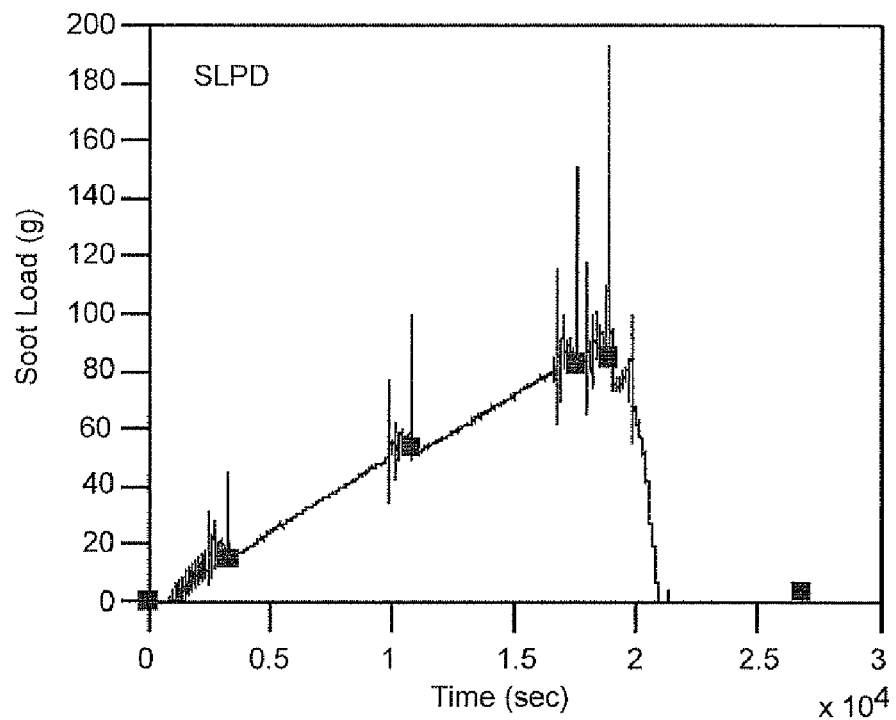
FIGS. 4A-4D show results obtained from tests of soot load as a function of time corresponding to various engine testing cycles (an SLPD cycle in FIG. 4A; a CO cycle in FIG. 4B; an RMC cycle in FIG. 4C; and an FTP cycle in FIG. 4D)
Figure 4B:
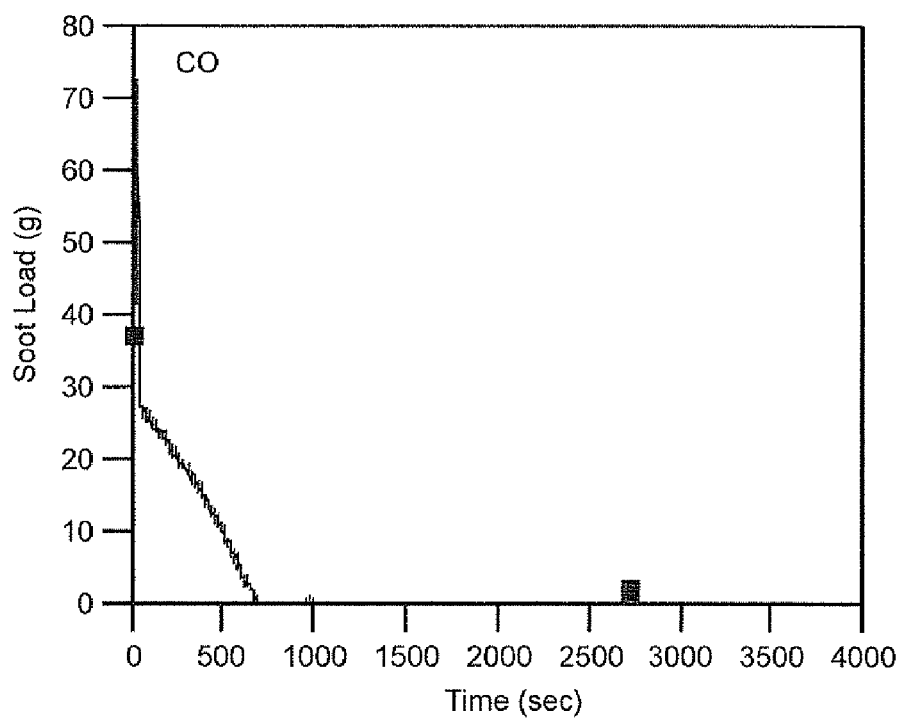
Figure 4C:
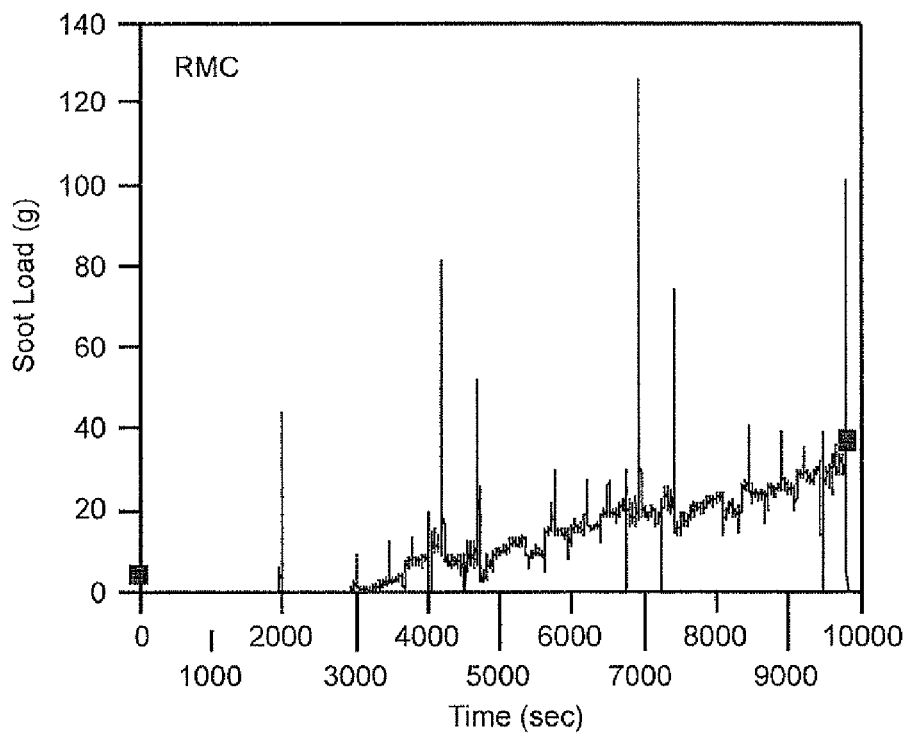
Figure 4D:
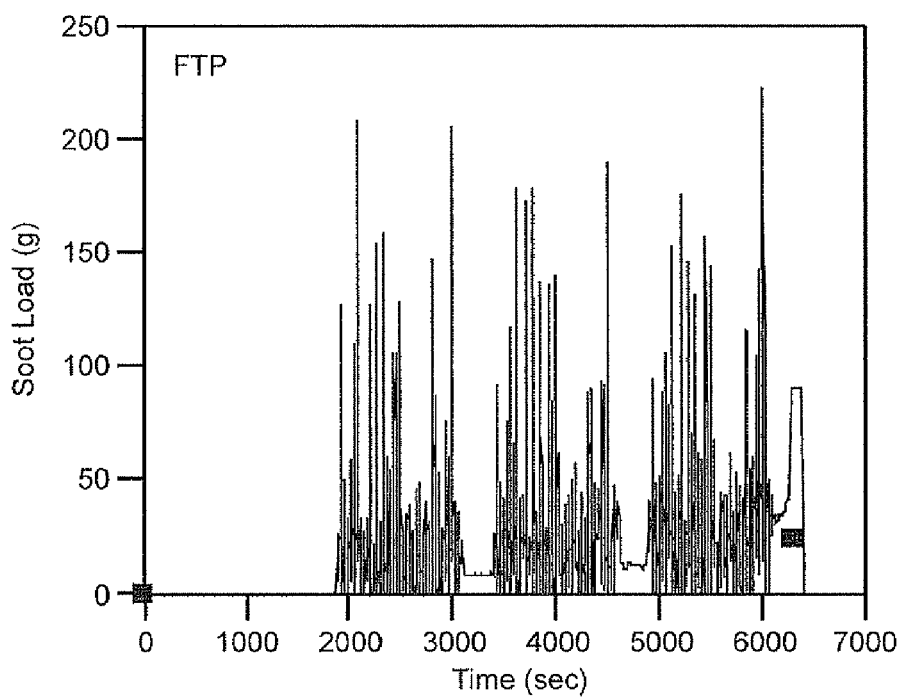
Figure 5A:
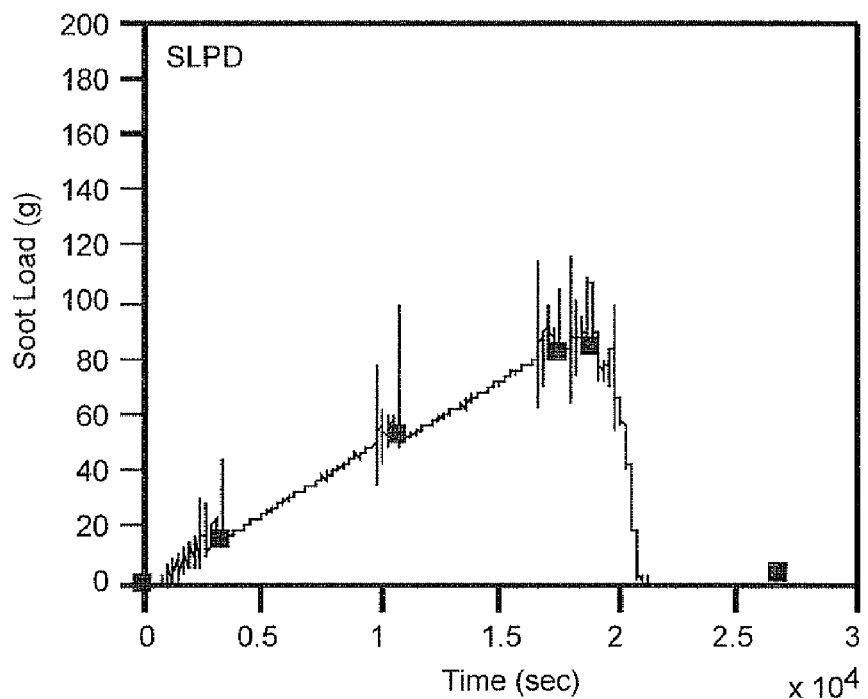
FIGS. 5A-5D show results obtained from tests of soot load as a function of time with gating, using engine testing cycles corresponding to FIGS. 4A-4D.
Figure 5B:
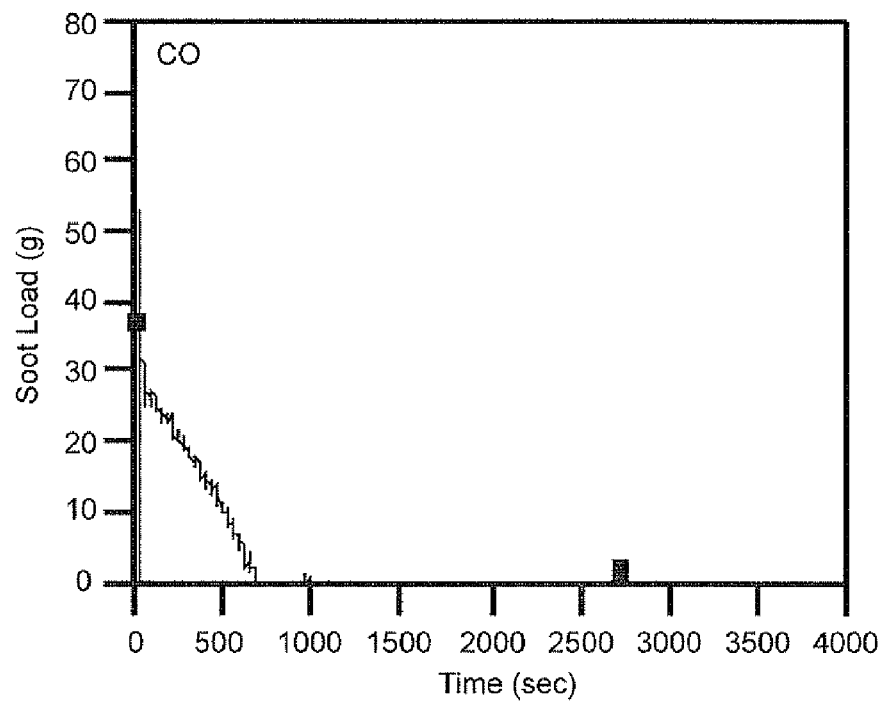
Figure 5C:
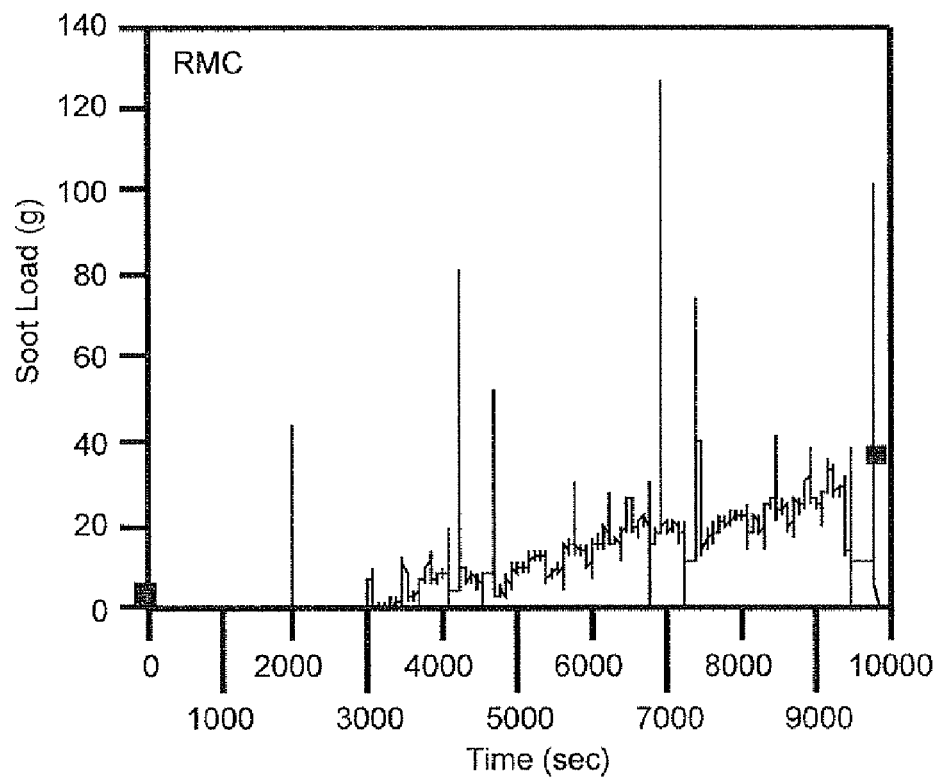
Figure 5D:
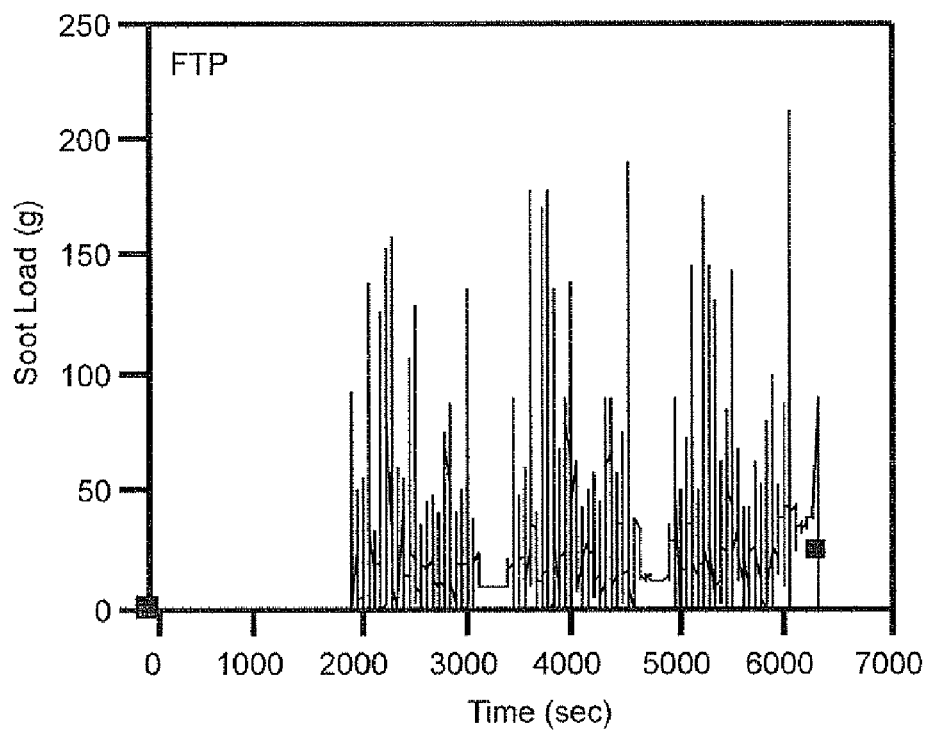
Figure 6A:
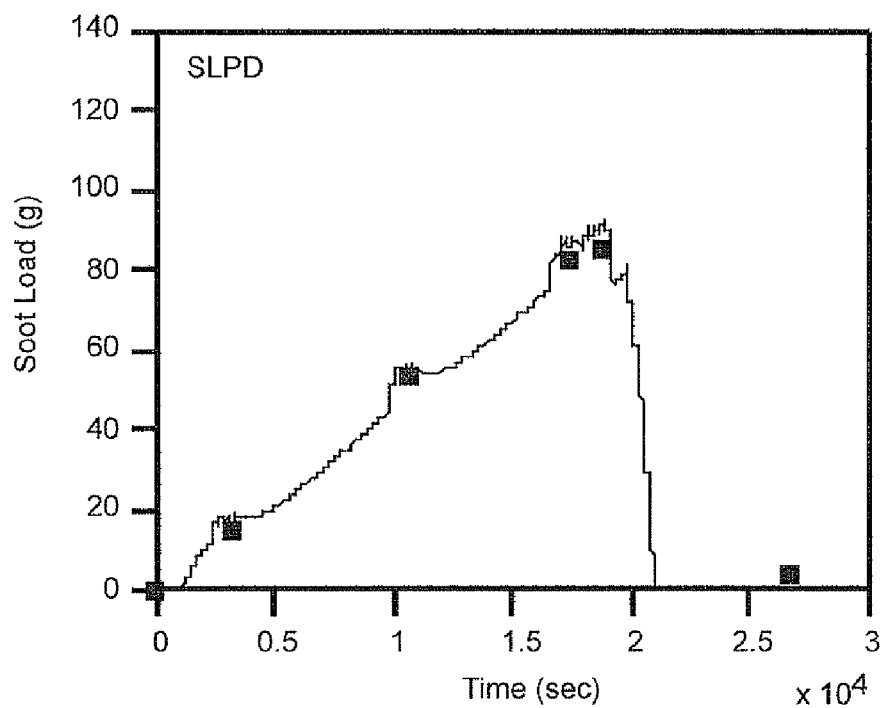
FIGS. 6A-6D show results obtained from tests of soot load as a function of time with gating and filtering, using engine testing cycles corresponding to FIGS. 4A-4D and 5A-5D.
Figure 6B:
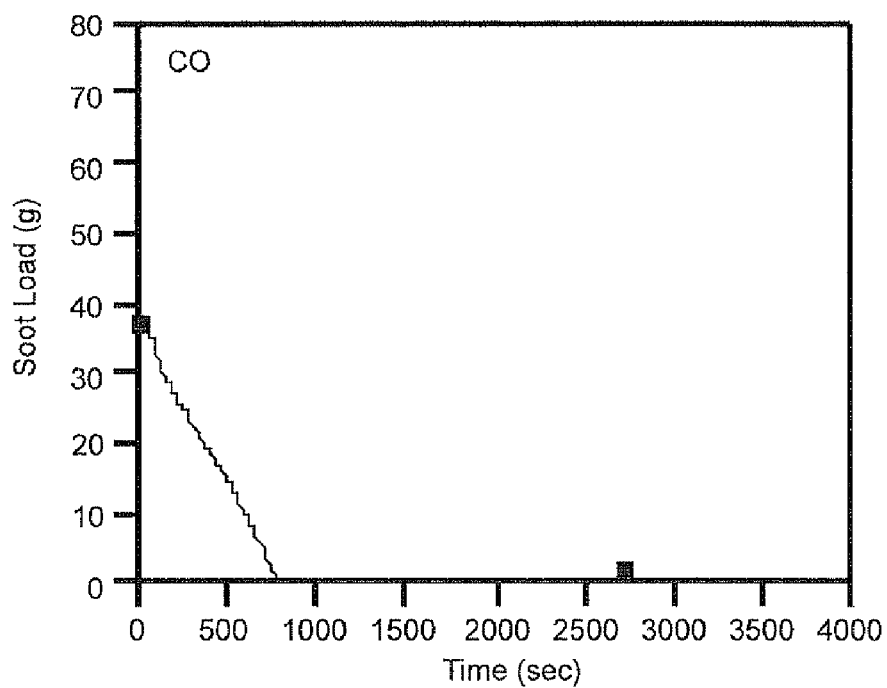
Figure 6C:
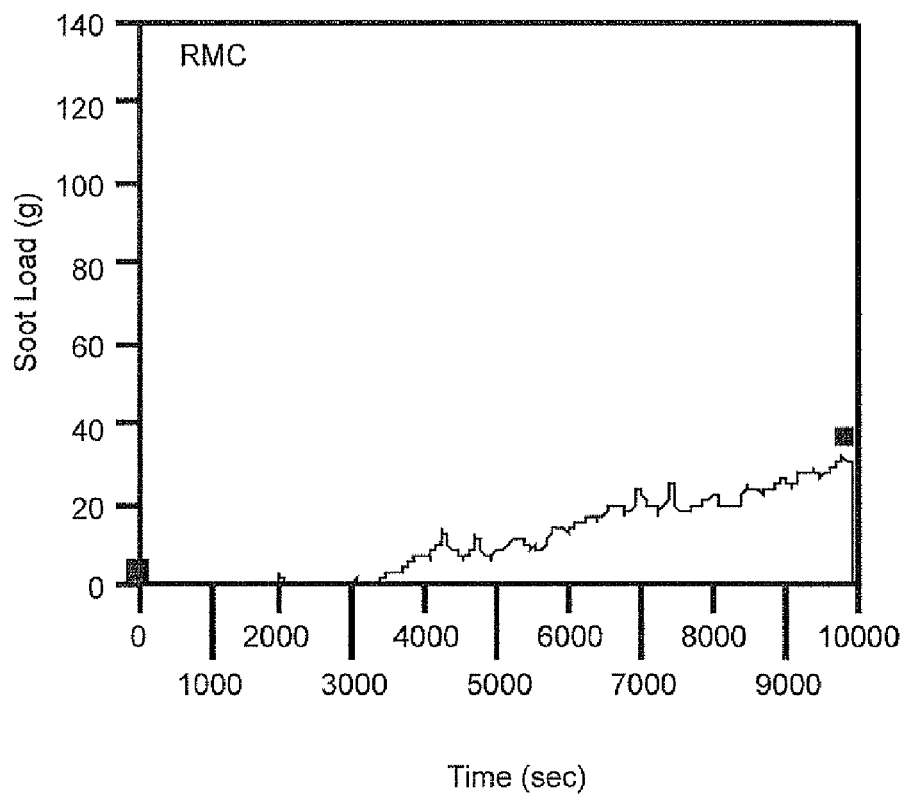
Figure 6D:
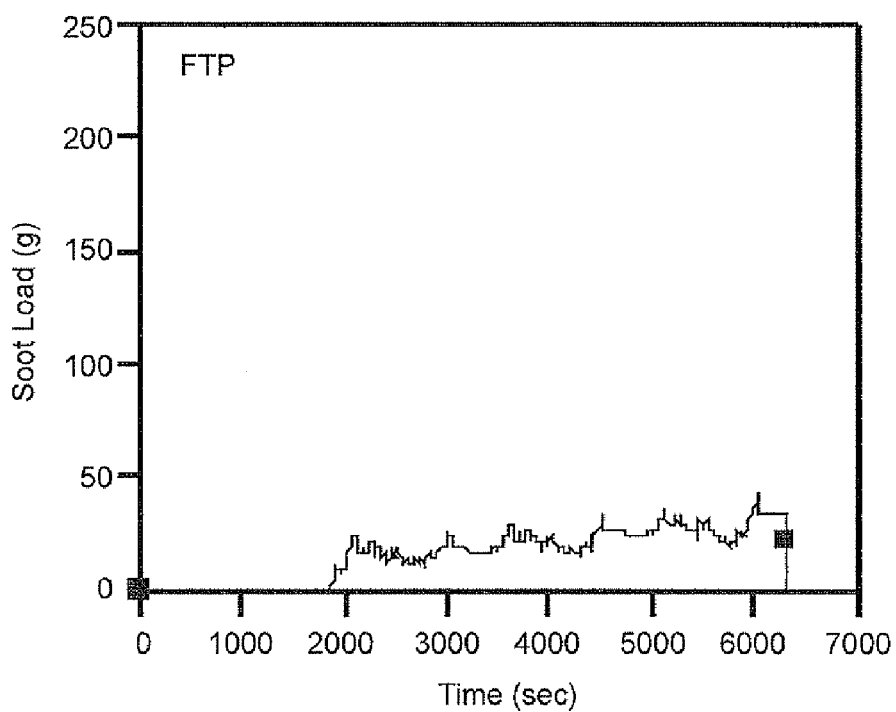

In accordance with the above teachings, tests were run under various engine testing cycles to demonstrate soot load estimates in accordance with the present teachings under a full range of engine operating conditions. The testing cycles shown include standard emission testing cycles as are known to those in the art, such as, for example, a Ramped Model Cycle (RMC) and a Federal Test Procedure (FTP), a clean out cycle (CO) representing active regeneration under controlled conditions, and a soot loading pressure drop cycle (SLPD) representing the general soot loading and pressure drop behavior of a particulate filter under controlled conditions. In FIGS. 4A-4D (collectively FIG. 4), soot load estimates, made in accordance with exemplary embodiments of the present teachings during the emission testing cycles mentioned above, are shown in comparison to actual soot load measurements (characterized by small squares on each plot), with the actual measurements obtained by weighing the filter at regular intervals. In particular, FIG. 4A shows estimates and actual measurements during an SLPD cycle; FIG. 4B shows estimates and actual measurements during a CO cycle; FIG. 4C shows estimates and actual measurements during an RMC cycle; and FIG. 4D shows estimates and actual measurements during an FTP cycle. As shown by FIG. 4, for each type of testing cycle, the soot load estimates were substantially identical or very close to the actual soot load measurements. However, the results of FIG. 4 also demonstrate a relatively significant amount of fluctuation in the soot load estimates, particularly during periods of unsteady-state engine operation (e.g. during the FTP testing cycle (FIG. 4D) which requires constant acceleration and deceleration during each of its phases: cold start, transient, and hot start).

In order to eliminate and/or reduce those fluctuations in soot load estimates, as discussed above, various exemplary embodiments of the present teachings contemplate using one or more gates and/or filters to account for dynamic fluctuations and input discrepancies corresponding to the soot load estimates. The resultant improvement in soot load estimates when using gates and filters on the soot load estimates of FIGS. 4A-4D can be seen from the results shown in FIGS. 5A-5D and FIGS. 6A-6D, respectively.

FIGS. 5A-5D (collectively FIG. 5) illustrate the impact of gates on soot load estimates, and again also show the resulting soot load estimates and the actual soot load measurements as in FIG. 4 during various emission testing cycles. In FIG. 5, temperature input data was gated between about 150° C. to about 550° C. and flow rate input data was gated between about 100 kg/hr to about 200 kg/hr. As in FIG. 4, the soot load estimates of FIG. 5 were substantially identical or very close to the actual soot load measurements shown by small square data points in the plots. As discussed above, gating input data before soot load estimates are calculated helps to ensure the fidelity of the data, thereby increasing accuracy and reducing fluctuations in soot load estimates. The reduction in fluctuations can be observed by comparing the results of FIG. 5 to the corresponding results in FIG. 4.

Although FIG. 5 employed temperature and flow rate gates, those skilled in the art would understand that such gates are exemplary only and not intended to be limiting of the present teachings or claims. Additional exemplary gates may include, for example, bed temperature, soot uniformity, pressure drop, oxidation rate, soot load rate, flow stability, pressure stability, etc. Furthermore, to employ gates, the present teachings contemplate using any known suitable gating methods and/or techniques as would be understood by those skilled in the art, and, as discussed above, gating may be applied to input data prior to soot load estimation and/or after soot load estimation Also comparing soot load estimates to actual soot load measurements, FIGS. 6A-6D (collectively FIG. 6) illustrate the impact of utilizing both gates and filters on soot load estimates. In FIG. 6, temperature and flow rate input data were gated as above (between about 150° C. to about 550° C. and between about 100 kg/hr to about 200 kg/hr) and soot load estimates were subjected to a low pass filter corresponding to about alpha ($\alpha$)=0.01, wherein alpha is a parameter input relating to the time constant of the low pass filter. As shown by comparing the results of FIG. 6 with the corresponding results of both FIG. 4 and FIG. 5, filtering soot load estimates helped to reduce the relatively large fluctuations produced by dynamic engine operating conditions, thereby generally providing greater accuracy in soot load estimates across the full range off engine operation. As in FIGS. 4 and 5, the results of FIG. 6 also demonstrate that the calculated soot load estimates were substantially identical or very close to the actual soot load measurements shown by the small square data points on the plots.

Although FIG. 6 employed a low pass filter, alpha ($\alpha$)=0.01, those skilled in the art would understand that this filter is exemplary only and not intended to limit the present teachings in any way. The present teachings contemplate any filter and/or filtering technique that can sufficiently reduce fluctuations in soot load estimates as would be understood by those skilled in the art. Furthermore, those skilled in the art would understand that the present teachings contemplate any possible gate/filter number and/or configuration, including, but not limited to, one or more filters used in combination with one or more gates, one or more gates used exclusive of any filters, and one or more filters used exclusive of any gates.

Thus, the results shown in FIGS. 4-6 demonstrate that the soot load estimate systems and methods described above and in accordance with various exemplary embodiments of the present teachings can be implemented over a wide range of engine operating conditions, while maintaining a relatively high level of accuracy in soot load estimation. Those having ordinary skill in the art would understand that the operating conditions described above and the engine cycles used for the tests are exemplary only and other operating conditions and/or engine cycles may be chosen depending on various factors without departing from the present teachings.

Although various exemplary embodiments shown and described herein relate to systems and methods for estimating soot load of a particulate filter used in an automobile exhaust treatment system, those having ordinary skill in the art would understand that the methodology and systems described may have a broad range of application to particulate filters useful in a variety of applications, including, but not limited to, coal combustion processes, various other internal combustion engines, stationary and non-stationary, and other particulate filtration applications for which determining when regeneration should occur may be desirable. Ordinarily skill artisans would understand how to modify the exemplary systems and methods described herein to estimate particulate load of a particulate filter used in an application other than with automobile engines.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It should be understood that while the invention has been described in detail with respect to certain exemplary embodiments thereof, it should not be considered limited to such, as numerous modifications are possible without departing from the broad scope of the appended claims.

We claim:

1. A method for regenerating a particulate filter, comprising:
    determining a temperature, a flow rate, and a total pressure drop of an exhaust gas flowing through a particulate filter,
    wherein the total pressure drop of the exhaust gas is determined by determining inlet contraction losses, outlet expansion losses, inlet channel losses, outlet channel losses and permeable layer losses of the exhaust gas through the particulate filter, and wherein at least one of the losses is determined based on the determined temperature;
    determining an Euler number and a Reynolds number corresponding to the fluid flowing through the particulate filter;
    determining a corrected soot layer permeability based on the temperature;
    calculating an estimated soot load of the particulate filter based on the total pressure drop and the corrected soot layer permeability, wherein calculating the estimated soot load comprises:
        determining a Stokes-Cunningham correction factor to the soot layer permeability, and
        calculating the product of the Euler number, the Reynolds number, and the Stokes-Cunningham correction factor to the soot layer permeability; and
    causing regeneration of the particulate filter when the estimated soot load is greater than or equal to a threshold value.

2. The method of claim 1, further comprising estimating an ash load of the particulate filter.

3. The method of claim 2, wherein estimating the ash load comprises estimating the ash load based on at least one of oil consumption and engine operating time.

4. The method of claim 1, wherein determining the total pressure drop, the flow rate, and the temperature comprises one of estimating the total pressure drop, the flow rate, and the temperature and measuring the total pressure drop, the flow rate, and the temperature.

5. The method of claim 1, further comprising applying at least one gate for estimating the soot load.

6. The method of claim 1, further comprising applying at least one filter for estimating the soot load.

7. The method of claim 1, further comprising applying one or more gates and filters for estimating the soot load.

* * * * *